United States Patent Office 3,448,111
Patented June 3, 1969

3,448,111
PROCESS FOR THE PRODUCTION OF
ARYL-SUBSTITUTED SULFONES
Hanswilli von Brachel, Offenbach (Main), and Karl Hintermeier, Frankfurt am Main-Fechenheim, Germany, assignors to Cassella Farbwerke Mainkur Aktiengesellschaft, Frankfurt am Main-Fechenheim, Germany, a company of Germany
No Drawing. Filed Aug. 26, 1966, Ser. No. 575,229
Claims priority, application Germany, Sept. 7, 1965, C 36,819
Int. Cl. C07d 31/48; C07c 149/00, 15/10
U.S. Cl. 260—294.8                                      3 Claims

ABSTRACT OF THE DISCLOSURE

Alpha phenethyl sulfolane and similar aryl-substituted sulfones are made by condensing styrene or similarly conjugated aryl-substituted olefin with the appropriate sulfone that has an alpha hydrogen. The products so made are used for separating aromatic and aliphatic hydrocarbons and are also chemical intermediates.

The present invention relates to novel aryl-substituted sulfones and a process for their production.

These sulfones are obtained by adding arylconjugated olefines, in the presence of alkali alcoholates, hydrides, or amides or potassium hydroxide, to sulfones that contain, in α-position to the sulfone group, at least one hydrogen atom capable of substitution.

The majority of the sulfones preparable under this invention correspond to the formula

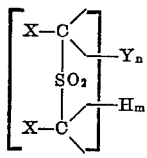

wherein the substituents X stand for hydrogen atoms or lower alkyl groups or form together an ethylene bridge, the residue Y stands for

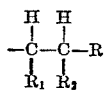

wherein R is a member of the group consisting of phenyl, tolyl, pyridyl, and thienyl, $R_1$ and $R_2$ are members of the group consisting of a hydrogen atom, lower alkyl, and phenyl, $n$ is an integer of 1 through 4, $m$ is an integer of 0 through 3, and the sum of $m+n$ is 4, or to the formula

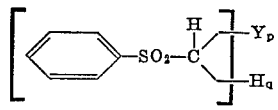

wherein:
Y has the meaning given above,
$p$ is an integer of 1 through 2,
$q$ is an integer of 0 through 1, and the sum of $p+q$ is 2.

The alkali alcoholates, hydrides or amides as well as the potassium hydroxide used as basic catalysts may be employed either in their pure form or as crude products of a technical grade. They are added to the reaction mixture in stoichiometric or catalytic amounts, preferably in amounts ranging between 0.01 mol and 1 mol per mol of the arylconjugated olefine.

Arylconjugated olefines suitable for the process of the present invention are, for example, styrene, α-methylstyrene, β-methylstyrene, α-phenylstyrene, β-butylstyrene, β-hexylstyrene, vinyltoluenes, stilbene, α-phenyl-β-methylstyrene, as well as, vinylpyridines and vinylthiophenes. Furthermore, such aryl-olefines are suited as undergo a change in the alkaline medium with displacement of the double bond to give arylconjugated olefines. Allyl benzene is such an example.

As starting sulfones there are suited, in particular, dimethyl sulfone, methylethyl sulfone, dipropyl sulfone, methylphenyl sulfone, dibenzyl sulfone, benzylphenyl sulfone, methylbenzyl sulfone, methyl-(ω-phenylpropyl)-sulfone, methylbutyl sulfone, methylphenethyl sulfone, phenylisopropyl sulfone, phenyl - (α - benzylethyl) - sulfone, phenyl-(α-phenethyl-ethyl)-sulfone, tetramethylene sulfone, α-methyl-tetramethylene sulfone, etc.

The addition of the arylconjugated olefine to the initial sulfone may, in many cases, be effected at room temperature. However, it is preferable to operate at temperatures ranging between 60 and 150° C. because by this a substantial curtailment of the reaction-time is achieved. The yields obtained according to this invention average between 50 and 100% of the theoretical.

The sulfones made according to the present invention represent valuable intermediates for the synthesis of dyestuffs and pharmaceuticals. Moreover, these products may successfully be employed, particularly when they do not have too high a molecular weight, for the separation of aromatic and aliphatic hydrocarbons from hydrocarbon mixtures of a technical grade.

The following examples are given for the purpose of illustrating the present invention. Unless otherwise stated, all temperatures given are in degrees centigrade.

EXAMPLE 1

500 g. tetramethylene sulfone (sulfolane) and 56 g. pulverized potassium hydroxide are heated to 115–120° and then admixed, whilst thoroughly stirring, with 104 g. styrene, in the course of one hour. The mixture is stirred for a further 2 hours at the same temperature and the excess tetramethylene sulfone is vacuum distilled off to a large extent. The residue is stirred into 1 litre iced water and neutralized with hydrochloric acid. α-Phenethyl-tetramethylene sulfone separates as a white precipitate that may easily be filtered off. Yield: 206 g. (92% of the theoretical) having a melting point of 68–69° after recrystallization from equal parts of benzene and cyclohexane.

In an analogous manner can be prepared the arylsubstituted sulfones enumerated in the table hereinafter. During the neutralization step they in most cases precipitate in the form of oils which are then preferably extracted by shaking out with chloroform or chlorobenzene, and recrystallized or distilled, after the solvent has been distilled off. In general, the yields range between 50 and 90%.

| Initial Sulfone | Olefine/mols | End Product | Yield, Percent | Boiling Point, ° | Melting Point, ° |
|---|---|---|---|---|---|
| Dimethylsulfone | Styrene/1 | Methyl-(γ-phenylpropyl)-sulfone | 86 | | 64–66 |
| Do | Styrene/2 | Bis-(γ-phenylpropyl)-sulfone | 51 | | 113–115 |
| Methyl-(γ-phenylpropyl)-sulfone | Styrene/1 | do | 82 | | 113–115 |
| Do | α-Methyl-styrene'/1 | (γ-Phenylpropyl)-(γ-phenylbutyl)-sulfone | 53 | 205–210°/0.1 mm | |
| Dimethylsulfone | α-Methyl-styrene/1 | Methyl-(γ-phenylbutyl)-sulfone | 81 | | 47–49 |
| Do | α-Methyl-styrene/2 | Bis-(γ-phenylbutyl)-sulfone | 62 | 210°/0.1 mm | |
| Do | α-Methyl-styrene/3 | (γ-Phenylbutyl)-[2,6-diphenylheptyl-(4)]-sulfone | | 255°/0.2 mm | |
| Do | 2-vinyl-pyridine/1 | Methyl-[γ-pyridyl-(2)-propyl]-sulfone | 77 | 145–146°/0.01 mm | |
| Di-n-propyl-sulfone | Styrene/1 | Propyl-(α-phenethylpropyl)-sulfone | 85 | 148–150°/0.1 mm | |
| Methylphenyl sulfone | do | Phenyl-(γ-phenylpropyl)-sulfone | 72 | | 83–85 |
| Tetramethylene sulfone | Styrene/2 | α,α'-Di-phenethyl-tetramethylene sulfone | | | 87–89 |
| α-Phenethyl-tetramethylene sulfone | do | do | 74 | | 87–89 |
| Tetramethylene sulfone | α-Methyl-styrene/2 | α,α'-Di-(β-phenylpropyl)-tetramethylene sulfone | | 200–205°/0.1 mm | |
| Do | 2-vinyl-pyridine/1 | α-[β-Pyridyl-(2)-ethyl]-tetramethylene sulfone | 72 | 160–161°/0.1 mm | |

EXAMPLE 2

500 g. tetramethylene sulfone are stirred, under anhydrous conditions and a nitrogen atmosphere, together with 24 g. sodium hydride at 80 to 90°. Subsequently, 118 g. α-methylstyrene are dropwise added in the course of one hour at 110 to 120°, and the reaction mixture is then kept at this temperature for a further 2 hours. After the excess tetramethylene sulfone has been vacuum distilled off, the residue is diluted with 1 liter water and neutralized with hydrochloric acid. A yellowish oil separates, is isolated by means of a separating funnel, and purified by distillation. At a boiling point of 161–163°/0.15 mm. Hg, 202 g. (85% of the theoretical) of α-(2-phenylpropyl)-tetramethylene sulfone are distilled off in the form of an almost colorless and somewhat viscous oil. This product is easily soluble in benzene and difficultly soluble in cyclohexane.

When sodium, potassium or lithium amide or sodium methyl are used as catalysts in place of the sodium hydride in Example 2, the α-(2-phenylpropyl)-tetramethylene sulfone is obtained with similar good yields.

Replacing the α-methylstyrene by 4-vinylpyridine, α-(4-pyridinoethyl)-tetramethylene sulfone is analogously obtained. It has a melting point of 66 to 68° after recrystallization from benzene and cyclohexane.

It will be understood that this invention is susceptible to further modification and, accordingly, it is desired to comprehend such modifications within this invention as may fall within the scope of the appended claims.

We claim:

1. A process for the production of alpha-(2-arylethyl)-sulfones which comprises condensing an aryl ethylene in which the aryl is selected from the class consisting of phenyl, pyridyl and thienyl, at a temperature ranging between room temperature and 150° C. and in the presence of an alkali alcoholate, an alkali hydride, an alkali amide, or potassium hydroxide, with a lower alkyl or tetramethylene sulfone that contains, in α-position to the sulfone group, at least one hydrogen atom capable of substitution.

2. The process of claim 1 in which the aliphatic sulfone is a tetramethylene sulfone.

3. A lower alkyl or tetramethylene sulfone having on at least one carbon alpha to the sulfur, at least one beta-aryl-ethyl group.

References Cited

Truce et al.: L. Org. Chem., No. 11, pp. 3277–80 (1964).

HENRY R. JILES, *Primary Examiner.*

A. L. ROTMAN, *Assistant Examiner.*

U.S. Cl. X.R.

260—290, 329, 332.1, 609, 669, 674